United States Patent
Jopling

(10) Patent No.: US 7,063,297 B2
(45) Date of Patent: Jun. 20, 2006

(54) MOUNTING ASSEMBLY

(75) Inventor: Kenton Jopling, Broken Arrow, OK (US)

(73) Assignee: Lowrance Electronics, Inc., Tulsa, OK (US)

( * ) Notice: Subject to any disclaimer, the term of this patent is extended or adjusted under 35 U.S.C. 154(b) by 33 days.

(21) Appl. No.: 10/610,300

(22) Filed: Jun. 30, 2003

(65) Prior Publication Data

US 2004/0262479 A1   Dec. 30, 2004

(51) Int. Cl.
*E04G 3/00* (2006.01)
*A47F 5/12* (2006.01)

(52) U.S. Cl. ............. 248/292.12; 248/137; 248/292.13

(58) Field of Classification Search ............. 248/311.2, 248/309.1, 314, 292.13, 292.12, 620, 27.3, 248/63.4, 137, 139, 141; 403/83, 84, 96, 403/97, 101, 104
See application file for complete search history.

(56) References Cited

U.S. PATENT DOCUMENTS

| | | | |
|---|---|---|---|
| 3,414,686 A | | 12/1968 | Reinthaler |
| 3,965,497 A | * | 6/1976 | Corsette ..................... 4/227.5 |
| 3,990,744 A | * | 11/1976 | Rodaway ............... 297/423.29 |
| 4,436,269 A | * | 3/1984 | Dirksing et al. ............ 248/214 |
| 4,797,916 A | | 1/1989 | Kojima |
| 5,109,411 A | | 4/1992 | O'Connell |
| 5,127,762 A | | 7/1992 | Havlovitz |
| 5,343,006 A | * | 8/1994 | Moffett ....................... 200/296 |
| 5,429,481 A | * | 7/1995 | Liu ............................ 416/246 |
| 5,551,125 A | | 9/1996 | Adams |
| 5,568,548 A | | 10/1996 | Repplinger et al. |
| 5,574,700 A | * | 11/1996 | Chapman ................... 367/173 |
| 5,655,736 A | | 8/1997 | Kozloff et al. |
| 5,878,802 A | * | 3/1999 | Richter et al. .............. 160/135 |
| 6,007,038 A | | 12/1999 | Han |
| 6,095,470 A | | 8/2000 | Kalis |
| 6,173,933 B1 | | 1/2001 | Whiteside et al. |
| 6,413,004 B1 | | 7/2002 | Lin |
| 6,427,959 B1 | * | 8/2002 | Kalis et al. ............ 248/288.11 |
| 6,464,185 B1 | | 10/2002 | Minelli et al. |
| 6,663,064 B1 | * | 12/2003 | Minelli et al. ........... 248/205.5 |
| 6,752,462 B1 | * | 6/2004 | Kain et al. ............. 297/411.38 |
| 2001/0010778 A1 | | 8/2001 | Hilton et al. |
| 2001/0046409 A1 | | 11/2001 | Fischer |

* cited by examiner

*Primary Examiner*—Anita King
*Assistant Examiner*—Tan Le
(74) *Attorney, Agent, or Firm*—Alston & Bird LLP

(57) ABSTRACT

A mounting assembly includes first and second mounts that connect two objects, such as an electronic instrument housing and a surface. The first mount engages the second mount at a receptacle by way of cooperating detent members. One mount includes a resilient member, upon which cooperating detent members are disposed. The resilient member provides a bias to cause secure engagement of the cooperating detent members. Other features of the mounting assembly include rotational engagement between first and second cooperating detent members such that the angle of the first mount may be adjusted with respect to the angle of the second mount. Also, lead-ins may be included on the second mount so that the resilient members on the first mount may be depressed to ensure proper engagement of the cooperating detent members.

6 Claims, 9 Drawing Sheets

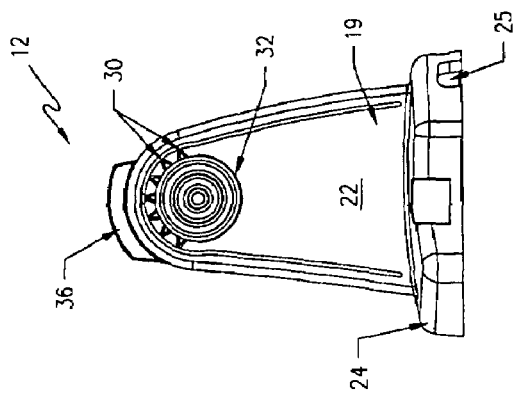
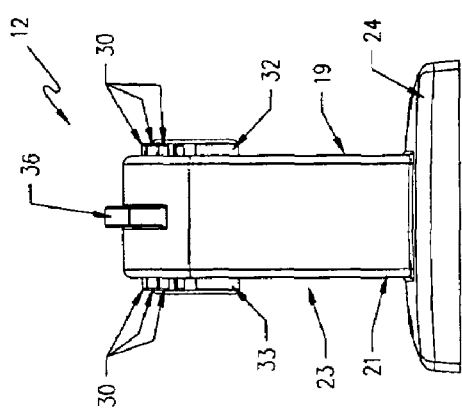
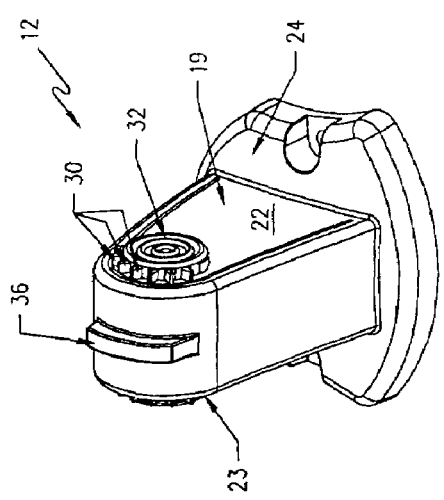

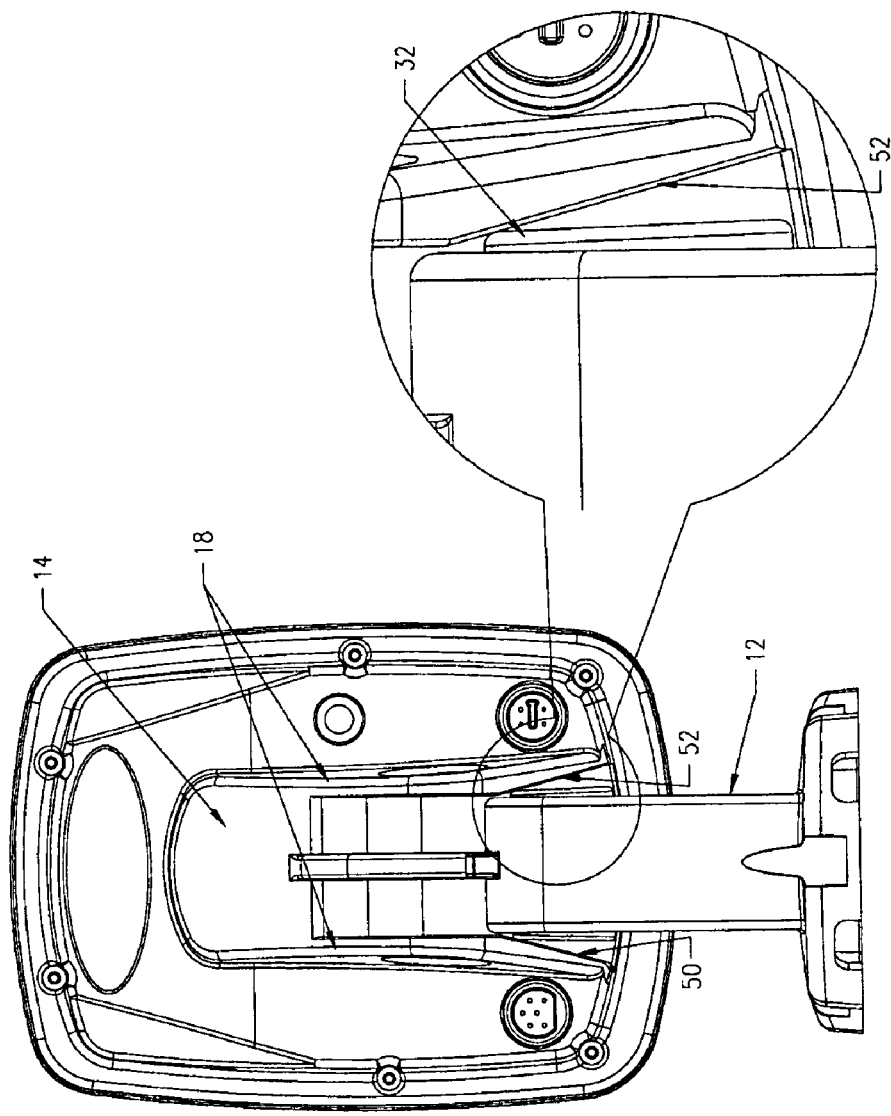

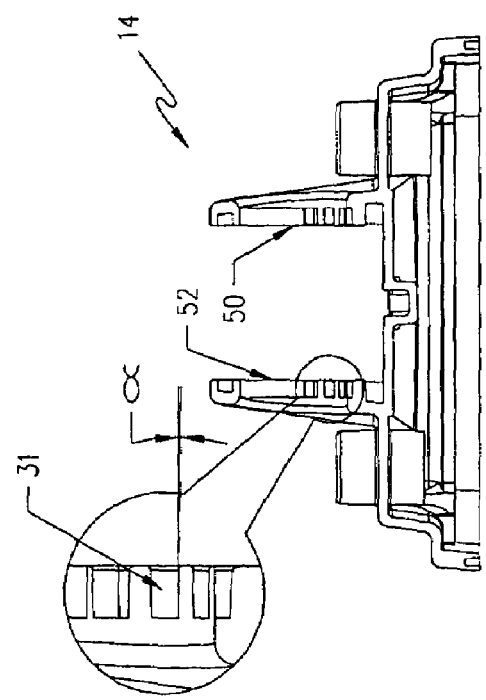
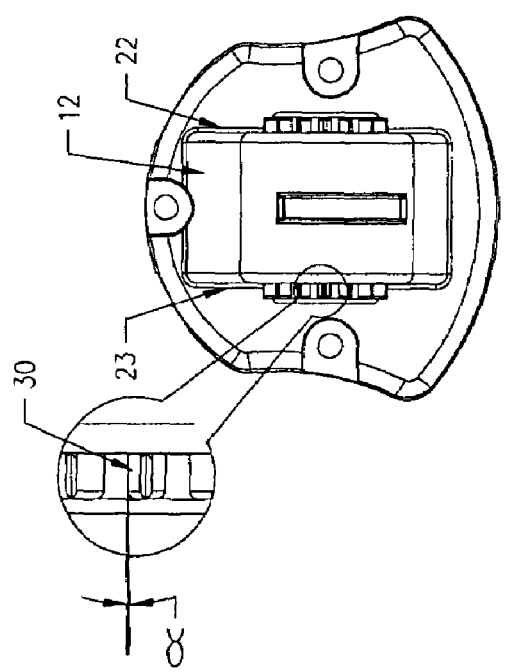
FIG. 7B
FIG. 7A

MOUNTING ASSEMBLY

FIELD OF THE INVENTION

The invention relates to mounting assemblies, and more particularly, to mounting assemblies having cooperating detent members for engaging a first mount to a second mount.

BACKGROUND OF THE INVENTION

Electronic instruments mounted on the dashboards or other panels of vehicles, such as boats, must be securely mounted to withstand the harsh conditions to which they may be subjected. The importance of securely mounting instruments is particularly apparent for fast-moving vehicles, which typically subject the instruments to even greater forces. On boats, in particular, the instruments must withstand substantial forces acting on the instrument and the instrument panel resulting from choppy or rough water conditions. Furthermore, forces resulting from acceleration and deceleration of the boat may also produce substantial forces on the instrument.

Accordingly, it is necessary to securely mount the instruments to withstand these varying and harsh conditions. The mounting assemblies securing the instrument to a vehicle dashboard or other mounting panel should be mechanically stable to prevent relative movement between the instrument and the dashboard regardless of the conditions experienced by the boat. As will be apparent, the more firmly that the instrument is secured to a dashboard, typically the greater the durability and reliability of the instrument. Yet the mounting used to secure the instrument should be economical, lightweight and relatively easy to manufacture and install.

Finally, the mounting assembly must also be easily accessible to remove the instrument. This tends to be particularly important in vehicles that remain unattended or exposed to the environment for an extended period of time. To this end, it would be advantageous to provide a mounting assembly that is easily removable by hand, without additional tools or equipment. Moreover, easily removable instruments more easily facilitate replacement and repair. Accordingly, a mounting assembly should permit easy access and removal.

BRIEF SUMMARY OF THE INVENTION

The present invention provides various mounting assemblies that are advantageously adaptable for installation of a device of interest to a desired mounting object. For example, the mounting assemblies of the present invention can be used to mount electronic devices to vehicles, such as on a dashboard or other mounting panels.

Importantly, the mounting assemblies of the present invention include a first mount for connecting to a desired device and a second mount for connecting to a mounting object. The first and second mounts form a quick release mechanism to thereby mount the device of interest to the mounting object. The quick release mechanism allows the device mounted thereto to be rotated relative to the mounting object. This, in turn, allows the user to select a rotational position for the device. The quick release device may also include a lead-in feature that aids the user in connecting the first and second mounts together. Further, the quick release mechanism may include interlocking teeth that promote stability of the device when subjected to external forces. These and other features of the present invention are discussed further below.

Specifically, according to one embodiment of the invention, the mounting assembly comprises a first mount and a second mount. The first mount comprises opposed first and second sides, and a resilient member on the first side resiliently biased away from the second side. At least one first cooperating detent member is disposed on the resilient member. A second mount comprises a receptacle for releasably engaging said first mount. The receptacle includes at least one second cooperating detent member to engage the first cooperating detent member and is opposed to the bias of the resilient member so that the first and second cooperating detent members releasably engage the first and second mounts. The engagement thus prevents the first and second mounts from rotating relative to each other.

According to one aspect of the invention, the cooperating detent members comprise at least one tooth that engages a detent in order to rotationally secure the first mount to the second mount. Either the teeth or the detents may be disposed on either the receptacle or the connector, and in one embodiment the teeth are disposed on the first mount while the detents are disposed on the receptacle of the second mount. The tooth may be disposed outwardly from the side of the resilient member, and thus the detents receive the tooth for secure engagement. In embodiment, the tooth may have a draft angle measured orthogonal to the first side. The detent has a corresponding draft angle to mate flush with the tooth. The draft angle permits the teeth to disengage from the second cooperating detent members upon sufficient lateral force.

Another aspect of the first and second mounts includes a guide and a cooperating guide member disposed on the first and second mounts, respectively. The guide and guide member may comprise a spline disposed radially along the connector and a groove that receives the spline on the receptacle. In this manner, the spline and groove laterally stabilize the first mount with respect to the second mount, the lateral stabilization being orthogonal to the rotational engagement of the cooperating detent members.

Another aspect of the invention eases engagement of the at least one first cooperating detent members by depressing the resilient member inwardly prior to engaging the second cooperating detent members. A lead-in surface is disposed on the second mount and is beveled inwardly toward said receptacle. Therefore, a user may mount the connector into the receptacle by pressing the resilient member against the lead-in surface such that the resilient member is gradually depressed to the point of engagement of the cooperating detent members.

The resilient member, as described above, generally permits a releasable latch between cooperating members, and one advantageous device to achieve this is a cantilever resiliently biased through connection to a side of the connector. In this regard, the first cooperating detent member is disposed on an end of the cantilever so that it may be depressed in order to engage the second cooperating detent members. Additionally, a base connected may be attached end of said resilient member thus permitting the connector to be fastened to a surface, such as a vehicle dashboard.

BRIEF DESCRIPTION OF THE SEVERAL VIEWS OF THE DRAWINGS

Figure 1:
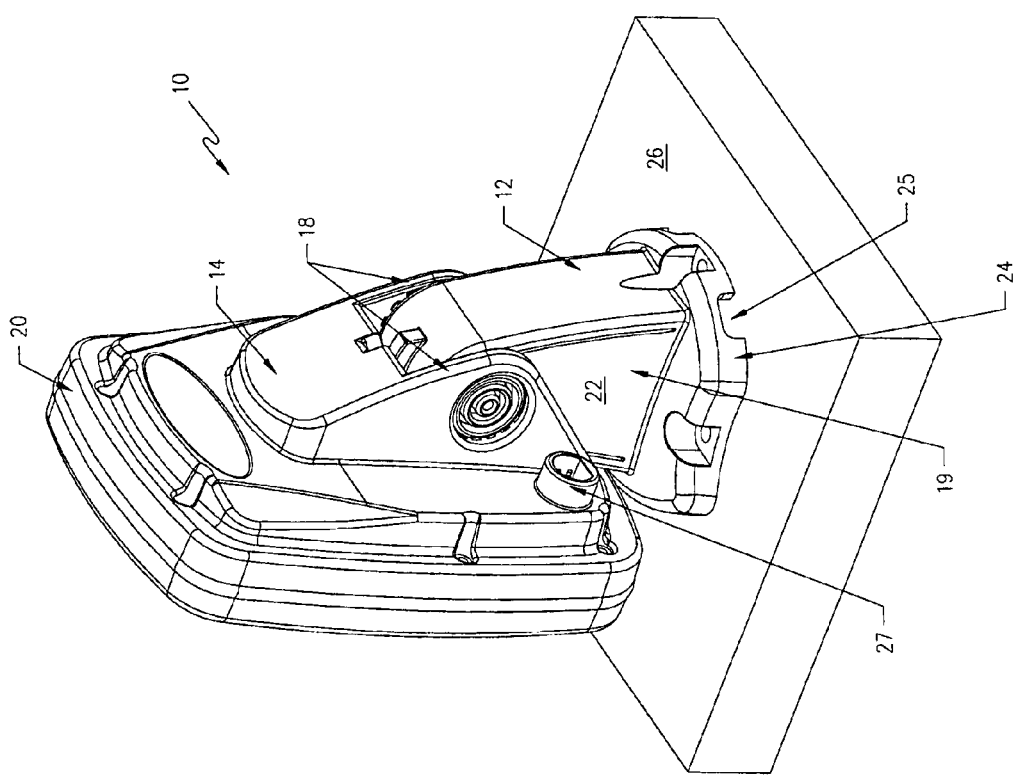
Figure 3C:
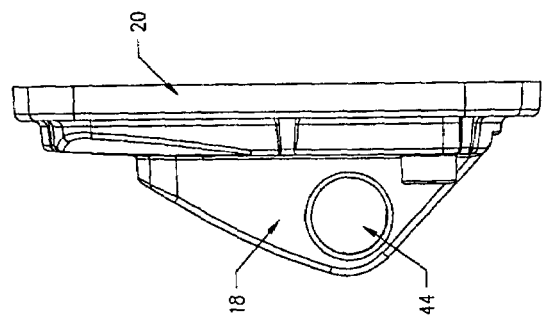
Figure 3B:
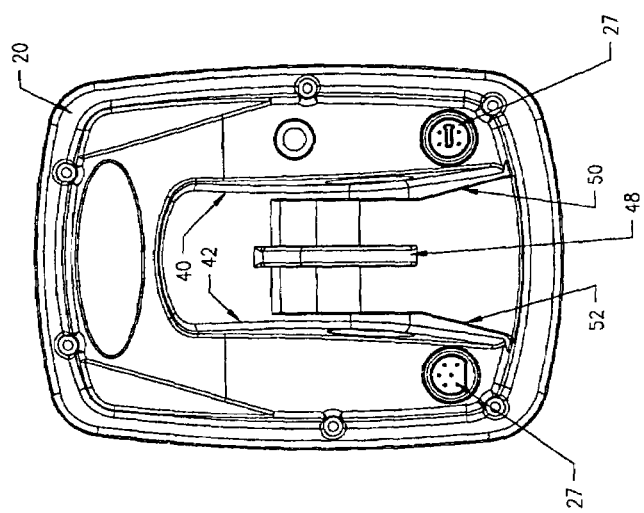
Figure 3A:
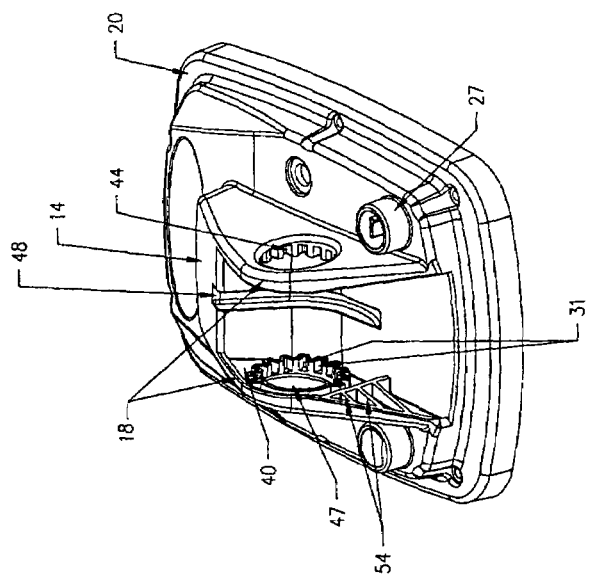
Figure 4C:
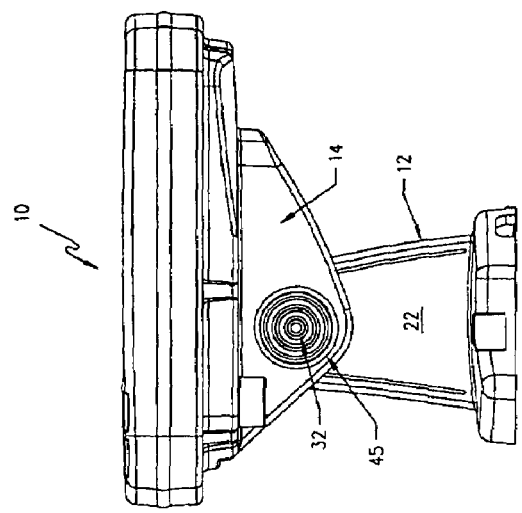
Figure 4B:
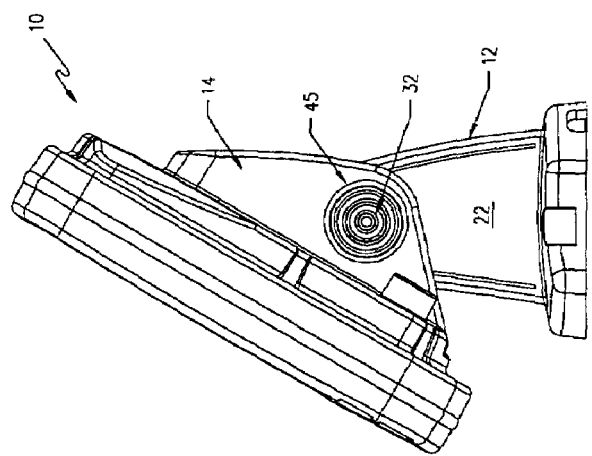
Figure 4A:
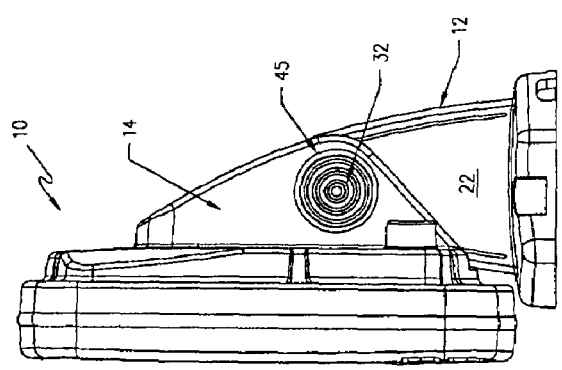
Figure 6:
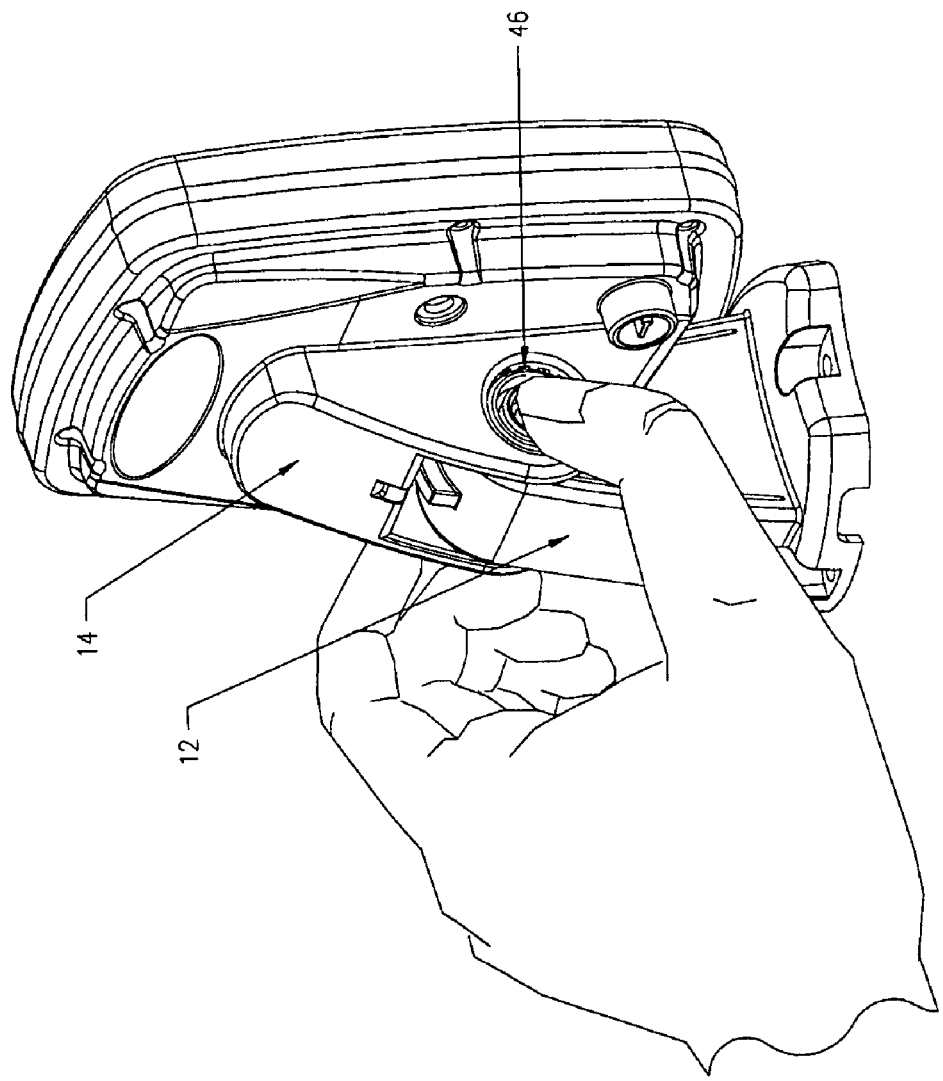
Figure 8C:
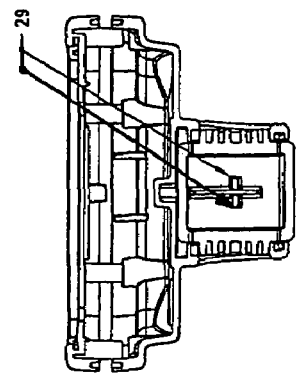
Figure 8B:
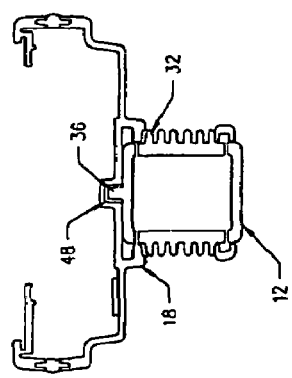
Figure 8A:
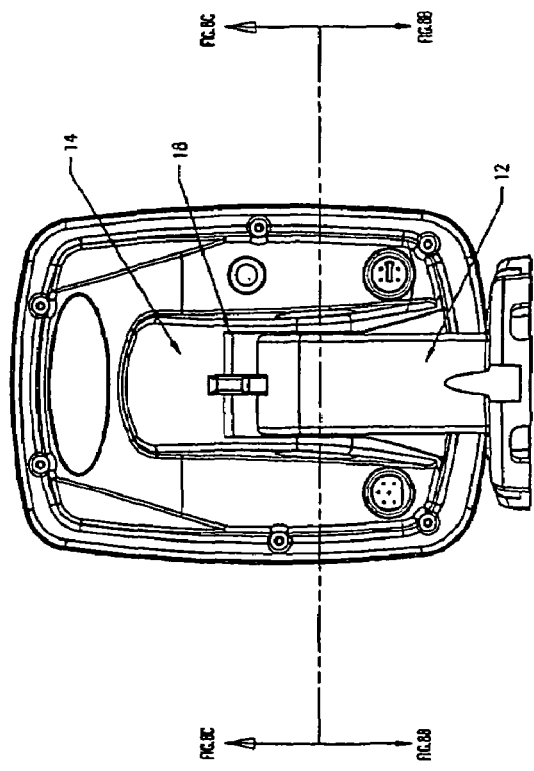
Figure 9B:
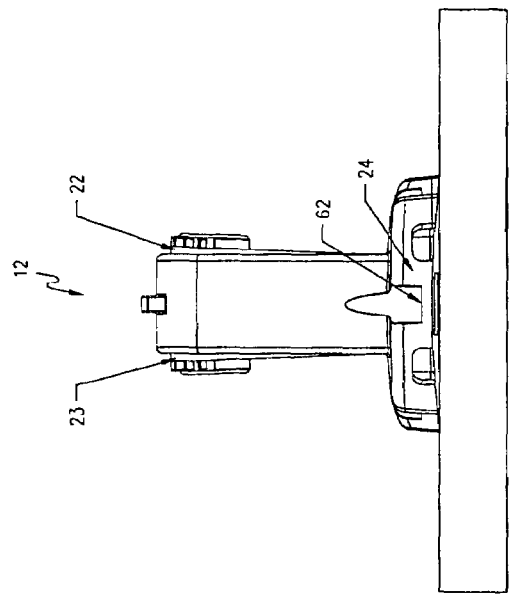
Figure 9A:
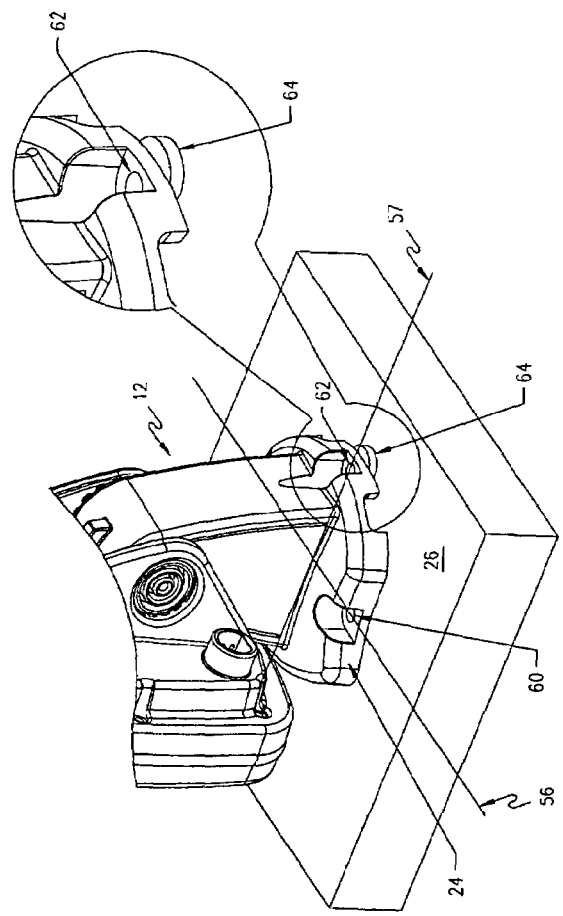

Having thus described the invention in general terms, reference will now be made to the accompanying drawings, which are not necessarily drawn to scale, and wherein:

FIG. 1 is a perspective view of a mounting assembly according to one embodiment of the present invention;

FIGS. 2(a)–2(c) are perspective, front, and side views, respectively, of a first mount comprising a connector according to one embodiment of the present invention;

FIGS. 3(a)–3(c) are perspective, front, and side views, respectively, of a second mount comprising a receptacle according to one embodiment of the present invention;

FIGS. 4(a)–4(c) are side views of a mount assembly according to one embodiment of the present invention rotated through a series of stop positions;

FIG. 5(a) is a back elevation view of a mounting assembly according to one embodiment of the present invention, while FIG. 5(b)B is enlarged view a portion of the back of the mounting assembly;

FIG. 6 is a perspective view illustrating releasing a first mount from a second mount of a mounting assembly according to one embodiment of the present invention FIGS. 7(a)–7(b) are a plan view of a first mount, and a front elevation view of a second mount, respectively, having detents and teeth with draft angles according to one embodiment of the present invention;

FIGS. 8(a)–8(c) are back elevation and cross sectional view, respectively, of a mounting assembly having a spine and groove according to one embodiment of the present invention; and FIGS. 9(a)–9(b) are perspective and front elevation views of a first mount attached to a surface having a shim to alter the bias of resilient members according to one embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As an initial point, in the below description, the mounting assembly of the present invention is illustrated and discussed in the context of mounting electronics and similar devices to a dashboard or other mounting panel. It must be understood, however, that the mounting assembly has many general uses and that the description of the mounting assembly in an electronic mounting environment is only one use of the system. The embodiments described below are provided to promote a clear understanding of the invention, but in no way are considered as limiting possible variations of the invention. It is hereby contemplated that the mounting assembly could be used in any context where one structure is to be mounted, mated, etc. with another structure. It is also noted that in the below embodiments, the first mount is illustrated as connected to a device and the second mount to a mounting surface.

Referring now to FIG. 1, a perspective view of a mounting assembly 10 is illustrated. In the illustrated embodiment, a first mount 12 is fastened to a surface 26, while a second mount 14 is connected to the back of an electronic housing. As used herein, second mount 14 includes a mounting device that includes a receptacle for engaging the first mount 12. It will be understood by one of ordinary skill in the art that mount is a generic term that includes all types of connectors and receptacles for connectors. Accordingly, either of the first mount 12 or the second mount 14 may be disposed on electronic housings, surfaces, or other devices and objects to which it is desired to mount one to another. That is to say that first and second mounts are interchangeable from apparatus to apparatus, for example, the second mount 14 may be fastened to a surface 26 and the first mount 12 attached to an electronic housing. As such, the embodiment illustrated herein is only one example of disposing the mounting assembly 10 of the invention.

Also shown in FIG. 1 is a first resilient member 22 disposed on a first side 19 of the connector. According to this particular embodiment, a second resilient member (not shown in FIG. 1, but labeled 23 in FIGS. 2(a) and 2(b)) is disposed on a second side 21 opposed to the first side 19. The first and second resilient members 22, 23 permit a portion of the first mount 12 to be depressed for insertion into the receptacle of the second mount 14 to achieve engagement therebetween. As such, cooperating detent members (also not shown in FIG. 1) on both the second mount 14 and the first mount 12 engage to secure the first mount 12 to the second mount 14.

The first mount 12 will now be described in greater detail with particular reference to FIGS. 2(a)–2(c). The first mount 12 of this embodiment attaches to a surface 26, such as a vehicle dashboard, by way of fasteners (not shown) disposed through fastener receptacles 60, 62 extending through a base 24 of the first mount 12. The first mount 12 extends from the base 24 having at least first and second sides. At least the first side 19 includes a first resilient member 22, and in this illustration, a second resilient member 23 is disposed on the second side 21. The first and second resilient members 22, 23 are biased away from its respective opposed side. In particular, first resilient member is biased relative to the second side 21, while the second resilient member 23 is biased relative to the first side 19. In the illustrated embodiment, the resilient members 22, 23 comprise cantilevers 22, 23 attached to first and second sides, respectively. Other resilient members are known to those of ordinary skilled and include devices such as leaf springs, coil springs, and other devices capable of being biased to perform the function of a resilient member of the present invention.

Disposed at each end of the first and second resilient members 22, 23 are first cooperating detent members 30 and in the illustrated embodiment, protrusion 32, 33 about which the first cooperating detent members 30 are disposed. The first cooperating detent members 30 cooperate and engage with second cooperating detent members 31 (FIGS. 3(a)–3(c)) disposed on the second mount 14 receptacle. The bias away from the opposed side of the first mount 12 permits the first cooperating detent member to securely engage the second cooperating detent member thus securing the first mount 12 to the second mount 14, described in more detail below.

The first and second resilient members 22, 23 will be depressed in order to achieve engagement between the first mount 12 and second mount 14, as will be described more fully with respect to operation of the mounting assembly 10. Over-depression of the first and second resilient members 22, 23 beyond their operational bias would otherwise cause structural damage to the resilient members. Therefore, to avoid over-depression, a pair of stops 29 (FIG. 8(c)) are provided on the interior end surface of the first mount 12. The stops of this embodiment comprise tabs 29 disposed at a predetermined distance in the direction against the bias of the resilient members and thus avoid over-depression (FIG. 8c).

According to this embodiment, the first cooperating detent members 30 comprise teeth that will engage with detents, (i.e. second cooperating detent members 31), which are correspondingly sized to securely hold the teeth. It should be noted that one of ordinary skill in the art will recognize that either first and second cooperating detent members 30, 31 may comprise teeth and the other a detent. Further, it must be understood that although the detents are disclosed herein as teeth, that any type of catch or locking mechanism is contemplated. For example, other cooperating detent members include ratchet assemblies, gears, and other cooperating detent members that perform an engagement function, and may be appropriately substituted without departing from the spirit or scope of the present invention.

In the illustrated embodiment of the first mount 12, the cooperating detent members extend from protrusions 32, 33 on the resilient members, and the protrusion provides an advantageous depression surface for the fingers of a person mounting or releasing the first and second mounts. In this case, the protrusion is a curved surface, and the first cooperating members are disposed about the curved surface. As will become apparent, the curved surface, and more particularly if the curved surface is circular, facilitates rotational positioning of the first and second cooperating detent members 30, 31. It is understood that rotational positioning could also be achieved where the protrusions are square or rectangular in shape and the corner of the squares or rectangles are used as the detents. A circular shaped protrusion is illustrated herein, however, as it typically facilitates easier rotation.

The base 24 of this particular embodiment is provided to permit fastening of the first mount 12 to a surface 26, such as a vehicle dashboard. The base 24 include fastener receptacles, one relative to each the first and second sides of the first mount 12, and one rear fastener receptacle. The positioning of these fastener receptacles permits adjustment of the bias of the resilient members, and will be described in more detail below. The base 24 also includes electrical cord passageways to permit passage of electrical cords through the base 24. Electrical cords often pass through a surface upon which the first mount 12 is fastened, and therefore, the first mount 12 may be fastened upon the electrical cord for to eliminate unnecessarily exposed electrical cords.

FIGS. 2(a)–2(c) also illustrates a cooperating guide member 36 disposed on the end surface of the first mount 12. The cooperating guide member 36 mates with a guide 48 disposed on the second mount 14 and provides lateral stability to the engagement of the first and second mounts. The cooperating guide member 36 of this embodiment comprises a spline that extends radially from the end surface of the first mount 12, and the appropriately sized guide 48 of the second mount 14 receives and restrains the cooperating member 36 against forces lateral to the cooperating guide member 36 and the engagement of the first and second cooperating detent members 30, 31. Although the guide member 36 is illustrated on the first mount and the guide 48 is illustrated on the second mount, it is understood that these could be switched so that the guide is on the first mount and the guide member is on the second mount.

In one advantageous embodiment of the first mount 12, the first mount 12 comprises one molded piece of acrylonitrile butadiene styrene terpolymer (ABS), or some other suitable polycarbonate alloy. As will become apparent, a one piece molded first mount 12 permits adjustment of the bias of the resilient member, improves durability, permits simple manufacture, in addition to the cost benefits of the molding process.

Referring now to FIGS. 3(a)–3(c), the second mount 14 will be described in greater detail. The second mount 14 comprises a receptacle that generally receives the first mount 12 for cooperative engagement. First and second sidewalls 40, 42 of the receptacle are opposed to one another and spaced apart at a width to receive the first and second sides of the first mount 12. On at least one of the sidewalls 40, 42 of the receptacle, and in this illustration, on first and second sidewalls 40, 42, second cooperating detent members 31 are disposed in a position to engage the first cooperating detent members. Also according to this illustration, the second cooperating detent members 31 comprise detents of a shape and size to receive and securely engage the first cooperating detent members 30, which are teeth in the illustrated embodiment. As previously discussed, it will be apparent to one of ordinary skill in the art that second cooperating detent members 31 may be either cooperating teeth or cooperating detents, and the disposition of detents on the second mount 14 is only illustrative of one embodiment.

According to this particular embodiment, the second cooperating detent members 31 are disposed in a curved manner about first and second apertures 44, 47 in the receptacle. The curve corresponds to the curve of the protrusions 32, 33 of the first mount 12, and when circular, permits rotational engagement of the first and second mounts 12, 14. The first and second apertures 44, 47 also permit the protrusions 32, 33 of the first mount 12 to be inserted therein. In this regard, the apertures 44, 47 permit access to the protrusions 32, 33 while the first mount 12 is engaged to the second mount 14. As such, the protrusions 32, 33 may be contacted to depress the first and second resilient members 22, 23 of the first mount 12 for releasing the first mount 12 from the second mount 14.

Also disposed on the second mount 14 of this embodiment are first and second lead-ins 50, 52 that lead-in to first and second apertures 44, 47, respectively. The lead-ins 50, 52 are sidewalls 40, 42 that are tapered outwardly from the receptacle by a spaced apart distance corresponding to a distance that permits contact with the protrusions 32, 33 of the first mount. Thus, the lead-ins 50, 52 may depress the first and second resilient members 22, 23 of the first mount 12, as will be described in more detail below. The lead-ins 50, 52 may comprise a regular surface such as a sidewall. Other lead-ins may comprise acceptable surfaces that likewise have an expanding taper outwardly from the receptacle permitting depression of the resilient members of the first mount 12, and may be substituted accordingly. In this embodiment, the lead-ins 50, 52 have ribs disposed longitudinally toward the their respective apertures 44, 47 for structural rigidity.

FIGS. 3(a)–3(c) also illustrate the guide 48 of the second mount 14. The guide 48 is disposed on an interior surface of the receptacle and positioned to receive the cooperating guided member of the first mount 12. The guide 48 permits the cooperating guide member 36, shown in FIGS. 2(a)–2(c), to be inserted to laterally stabilize the first mount 12 with respect to the second mount 14, discussed in more detail below.

In the illustrated embodiment, the second mount 14 is attached to the back of an electronic housing. The second mount includes electrical receptacles 27 to interconnect electronic instrument located therein. Advantageously the electrical receptacles 27 are disposed relative to the electrical cord passageways of the first mount 12. Like the first mount 12, it may be advantageous to form the second mount 14 of a single molded piece of ABS. In this regard, the back of the electronic instrument housing is molded with the second mount 14. As discussed above, however, first and second mount are interchangeable, and may be molded, fastened, attached, or connected in any manner to surfaces, electronic instrument housings, or other devices that are desired to be mounted with the first and second mounts 12, 14 of the present invention.

FIGS. 4(a)–4(c) illustrate the rotational engagement between the first and second mounts 12, 14 of this particular embodiment of a mounting assembly 10. As previously discussed, the first and second cooperating detent members 30, 31 may be disposed in a curved manner, such as circular. By providing a plurality of first and second cooperating detent members 30, 31, the first cooperating detent members may engage with different ones of the second cooperating detent members 31. At each position, the engagement accordingly results in a different angular arrangement of the first mount 12 with respect to the second mount 14. According to this embodiment, in collaboration with a vehicle surface and an electronic instrument, it is advantageous to dispose the first and second cooperating detent members 30, 31 to permit a range of rotation between horizontal, such as in FIG. 4(c), and vertical, such as in FIG. 4(a), so that a user of the electronic instrument may choose the angle at which the electronic instrument may be seen. Accordingly, spacing between the each of first and second detent members may divide the rotational engagement at multiple angular engagement positions, as may best assist the user and provide the user with multiple angular positions, such as in FIG. 4(b), between horizontal and vertical.

Referring now to FIGS. 5(a) and 5(b), the operation of the first and second lead-ins 50, 52 are illustrated. As previously stated, the first and second lead-ins 50, 52 are spaced apart corresponding to the distance between the protrusions 32, 33 on the first mount 12. The first and second lead-ins 50, 52 are also tapered away from the apertures 44, 47 beginning at a width at least as narrow as the apertures 44, 47 are spaced apart from each other and steadily widening. The first mount 12, therefore, may be inserted into the receptacle by way of the lead-ins 50, 52. In this regard, the lead-ins 50, 52 steadily depress the first and second resilient members 22, 23 against their bias to a width narrower than the distance between the first and second apertures 44, 47. Upon achieving depression to at least as narrow as the interior of the apertures 44, 47, the protrusions 32, 33 may spring back against the bias at the apertures, therefore permitting engagement of the first and second cooperating detent members 30, 31 when the protrusions extend into the apertures FIG. 6 illustrates how a user may release the first mount 12 from the second mount 14. The apertures 44, 47 advantageously permit access to the protrusions 32, 33 on the first and second resilient members 22, 23. Accordingly, the user may contact the protrusions 32, 33 to depress the first and second resilient members 22, 23 against the bias to at least as narrow as the interior of the aperture, thus disengaging the first and second cooperating detent members 30, 31. Upon achieving disengagement of the first and second cooperating detent members 30, 31, the user may withdraw the first mount 12 from the second mount 14. While not illustrated, the first and second mounts may also be engaged by depressing the resilient members, inserting them into the receptacle, and releasing the members. This would be an alternative to use of the lead-ins described in FIGS. 5(a) and 5(b), where the lead-ins are used to depress the resilient members.

FIGS. 7(a) and 7(b) illustrate another feature of the first and second cooperating detent members 30, 31, in which the detent members have a draft angle, $\alpha$. The surfaces of the first and second cooperating detent members 30, 31 each have a corresponding surface engaging one another. Each surface of extends outwardly from either the respective resilient member 22 or sidewall 50, 52, however, this particular embodiment each surface extends outwardly at a draft angle, $\alpha$, from orthogonal to the respective resilient member or the sidewall. The draft angle, $\alpha$, of each is the same so that the surfaces engage substantially flush to one another.

The draft angle, $\alpha$, of this embodiment is slight, however, so as to continue to permit secure engagement of the surfaces. In this regard, a slight draft angle permits transfer of a portion of the rotational force against the engagement of the cooperating detent members 30, 31 to be translated to lateral force against the bias of the first and second resilient members 22, 23. For an extremely large amount of force, the lateral transfer of force may become sufficient to depress the first and second resilient members 22, 23 enough to release the first and second cooperating detent members 30, 31. As such, the disengagement permits the first and second mounts 12, 14 to avoid structural damage, such as damage to the first and second cooperating detent members 30, 31. Accordingly, the size of the draft angle, $\alpha$, may be chosen according to structural damage parameters of the first and second mounts 12, 14, such as brittle fracture limits, elastic fatigue limits, etc.

FIGS. 8(a) and 8(b) more fully illustrate the engagement of the cooperating guide member 36 of the first mount 12 and the guide 48 of the second mount 14. In the cross-section of FIG. 8(b), it can be seen that the guide 48 and cooperating guide member 36 are disposed not only radially from the first and second cooperating detent members 30, 31, but also disposed with sides that contact laterally to the of the engagement of the first and second mounts 12, 14. Otherwise stated, the guide 48 and cooperating guide member 36 contact and resist movement of one another upon application of a force lateral to the engagement of the first and second cooperating detent members 30, 31. Therefore, lateral stability is provided in additional to the rotational stability provided by the cooperating detent members.

Referring to FIGS. 9(a) and 9(b), another advantageous feature of the invention includes the ability to adjust the resilient bias of the first and second resilient members 22, 23, and is particularly applicable to a first mount 12 comprised of a single molded piece. As previously discussed, fastener receptacles 60 are disposed on base 24 corresponding to first and second sides of the first mount 12. These two fastener 60 receptacles are along a first axis 56 corresponding substantially to the width of the first mount 12. A rear fastener receptacle 62 is disposed along a second axis 57 substantially perpendicular to the first axis 56. A spacer 64 placed between the rear fastener receptacle 62 and a surface 26 to which the first mount 12 is fastened, therefore produces a flexing of the base 24 about the second axis 57. The flex of the base 24 flexes first and second resilient members 22, 23 outwardly, therefore increasing the bias of the first and second resilient members 22, 23 away from their respective opposed sides. In this regard, the bias can be increased to more securely engage the first and second cooperating detent members 30, 31. Accordingly, a user may select the thickness of a spacer upon installation of the first mount 12 to selectively adjust the fit of the first and second cooperating members.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodi- That which is claimed:

1. A mount assembly comprising:
   a first mount comprising:
   opposed first and second sides;
   a resilient member disposed on said first side and being resiliently biased away from said second side; and
   at least one first cooperating detent member disposed on said resilient member; and
   a second mount comprising:
   a receptacle for releasably engaging said first mount; and
   at least one second cooperating detent member disposed on said receptacle to engage said first cooperating detent member of said first mount, said second cooperating detent member being opposed to the bias of said resilient member so that said first and second cooperating detent members releasably engage the first and second mounts,
   wherein one of said first and second cooperating detent members comprises at least one surface that protrudes from either said resilient member or said receptacle and the other of said first and second cooperating detent members comprises at least one surface that contacts the protruding surface to thereby prevent said first and second mounts from rotating relative to each other,
   wherein said first mount further comprises a stop opposed to depression of said resilient member toward said second side,
   wherein said first and second opposed sides extend from an end surface, and
   wherein said stop comprises a tab disposed on said end surface for engaging said stop being spaced a distance from an edge of said end surface to allow said resilient member to move a selected distance toward said second surface before engaging said stop.

2. The mount assembly according to claim 1, wherein said resilient member comprises a cantilever having an attached end connected to the first side.

3. The mount assembly according to claim 2, wherein said at least one first cooperating detent member is disposed on an end opposed to said attached end of said resilient member.

4. The mount assembly according to claim 2, wherein said first mount further comprises a base connected to the attached end of said resilient member.

5. The mount assembly according to claim 4, wherein said base comprises:
   a first axis of extension, said resilient member having a width extending substantially parallel to said first axis of extension; and
   a second axis of extension extending substantially perpendicular to said first axis of extension, wherein when said base is flexed along said second axis of extension, said resilient member is further biased away from said second side.

6. The mount assembly according to claim 4, wherein said base further comprises a plurality of fastener receptacles for receiving a plurality of fasteners to fasten the first mount to an object.

* * * * *